US011884565B2

(12) United States Patent
Miglio et al.

(10) Patent No.: US 11,884,565 B2
(45) Date of Patent: Jan. 30, 2024

(54) PROCESS FOR THE PRODUCTION OF BIO-OIL AND BIOGAS FROM BIOMASS

(71) Applicant: ENI S.P.A., Rome (IT)

(72) Inventors: Roberta Miglio, Novara (IT); Roberto Paglino, Novara (IT); Cristian Torri, Ravenna (IT); Alisar Kiwan, Ferrara (IT); Daniele Fabbri, Riccione (IT)

(73) Assignee: ENI S.P.A., Rome (IT)

( * ) Notice: Subject to any disclaimer, the term of this patent is extended or adjusted under 35 U.S.C. 154(b) by 41 days.

(21) Appl. No.: 17/260,317

(22) PCT Filed: Jul. 31, 2019

(86) PCT No.: PCT/EP2019/070707
§ 371 (c)(1),
(2) Date: Jan. 14, 2021

(87) PCT Pub. No.: WO2020/021127
PCT Pub. Date: Jan. 30, 2020

(65) Prior Publication Data
US 2021/0292673 A1 Sep. 23, 2021

(30) Foreign Application Priority Data

Jul. 27, 2018 (IT) .................. 102018000007569

(51) Int. Cl.
C10G 1/06 (2006.01)
C02F 3/30 (2023.01)
(Continued)

(52) U.S. Cl.
CPC ................. C02F 3/30 (2013.01); C02F 3/02 (2013.01); C02F 11/04 (2013.01); C10G 1/065 (2013.01);
(Continued)

(58) Field of Classification Search
None
See application file for complete search history.

(56) References Cited

U.S. PATENT DOCUMENTS 4,252,901 A * 2/1981 Fischer .................. C12M 23/58
210/603
5,525,228 A * 6/1996 Dague .................... C02F 3/286
210/603
(Continued)

FOREIGN PATENT DOCUMENTS

CA 2939565 A1 * 4/2009 .......... C05F 17/0027
CN 101302071 B 11/2008
(Continued)

OTHER PUBLICATIONS

International Search Report dated Oct. 25, 2019 for PCT application No. PCT/EP2019/070707.
(Continued)

Primary Examiner — Renee Robinson
Assistant Examiner — Alyssa L Cepluch
(74) Attorney, Agent, or Firm — Ruggiero McAllister & McMahon LLC

(57) ABSTRACT

There is a process for the production of a liquid fuel and of a gaseous fuel from biomass. The biomass is sent to a pre-treatment section to form a homogeneous phase that can be moved and/or pumped, wherein inert parts are separated from the biomass and the biomass shredded and/or ground to reduce its size. The homogeneous phase obtained is then subjected to subcritical hydrothermal liquefaction at a temperature between 240° C. and 310° C. to form a liquefied phase. The liquefied phase is separated. After separation, the process continues in two alternative and mutually exclusive modes. In the first mode, the first aqueous phase is subjected to an anaerobic reaction with multiple stages producing biogas; the oily phase is separated into a bio-oil and a solid
(Continued)

residue. In the second mode, the separate mixed phase is separated by density or dynamics forming a first aqueous phase, bio-oil and a gaseous phase. The first aqueous phase is subjected to a multiple-stage anaerobic reaction from which biogas, a muddy current and a second aqueous phase are produced.

5 Claims, 9 Drawing Sheets

(51) Int. Cl.
*C02F 3/02* (2023.01)
*C02F 11/04* (2006.01)
*C10L 3/08* (2006.01)
*C10L 9/08* (2006.01)
*C02F 103/36* (2006.01)

(52) U.S. Cl.
CPC ............... *C10L 3/08* (2013.01); *C10L 9/086* (2013.01); *C02F 2103/36* (2013.01); *C10G 2300/1011* (2013.01); *C10G 2300/4006* (2013.01); *C10G 2300/4012* (2013.01); *C10G 2300/805* (2013.01); *C10L 2290/26* (2013.01); *C10L 2290/547* (2013.01)

(56) References Cited

U.S. PATENT DOCUMENTS

| | | |
|---|---|---|
| 2004/0025715 A1 | 2/2004 | Bonde et al. |
| 2005/0113611 A1 | 5/2005 | Adams et al. |
| 2012/0073184 A1 | 3/2012 | Cranford et al. |
| 2014/0273141 A1 | 9/2014 | Atwood |

FOREIGN PATENT DOCUMENTS

| | | |
|---|---|---|
| CN | 102757890 B | 10/2012 |
| CN | 103717711 A | 4/2014 |
| CN | 104355512 A | 2/2015 |
| CN | 109022057 A | 12/2018 |
| WO | 2016169927 A1 | 10/2016 |
| WO | WO-2018045445 A1 * | 3/2018 ........... B01D 17/042 |

OTHER PUBLICATIONS

Written Opinion dated Oct. 25, 2019 for PCT application No. PCT/EP2019/070707.

Chinese First Notification of Office Action dated Jul. 7, 2023 for Chinese Patent Application No. 201980049854.X, 18 pages.

* cited by examiner

PROCESS FOR THE PRODUCTION OF BIO-OIL AND BIOGAS FROM BIOMASS

CROSS-REFERENCE TO A RELATED APPLICATION

The present application claims benefit from PCT/EP2019/070707, filed Jul. 31, 2019, which claim priority based on Italy Patent Appl. No. 102018000007569, filed Jul. 27, 2018. The contents of the foregoing applications are incorporated herein by reference in their entireties.

BACKGROUND OF THE DISCLOSURE

1. Field of the Disclosure

The present disclosure relates to a process for the production of liquid fuel, preferably bio-oil, and of a gaseous fuel, preferably biogas, from biomass, with the aim of obtaining a high conversion thereof to advanced biofuel combined with high energy efficiency.

2. Description of the Related Art

The review "M. Deniel et al Renewable and Sustainable Energy Reviews 54 (2016) 1632-1652" describes the recovery of food residues by liquefaction. Liquefaction under subcritical conditions is well studied, and an optimal temperature of around 300° C. is defined for most substrates.

The first liquefaction plant built to industrial scale was based on the "Changing World Technology CWT" technology developed on the basis of the U.S. Pat. No. 5,269,947, with a capacity of 200-250 t/day of waste from the turkey processing industry, transforming it into diesel, fertiliser products and coal. Said plant has had numerous shutdowns and has never reached full operational capacity. In 2009, the company owning the plant filed for bankruptcy. In 2011, the plant acquired from a Canadian company, Ridgeline Energy Services, was restarted, but remained operational for a couple of years (http://www.carthagepress.com/article/20130416/NEWS/13041 9181, 17/05/2018) and was shut down as it was making a loss. Liquefaction processes currently at the stage of development or demonstration, are also known in the art.

The liquefaction processes characterised by the highest level of development are known as "Hydro-Thermal Upgrading" (HTU) of Nextfuels and "CatLiq" of SCF Technology A/S and described in U.S. Pat. No. 7,262,331. HTU is carried out at (300-350° C.), (120-180) bar, contact time minutes. The CatLiq process described in EP 1879981 A2 is carried out at (350-420° C.) and (230-250) bar. The Cat-HTR process described in the documents EP 2178625B1, US 2013/0276361A1 and WO 2009/015409 of Ignite Energy Research is carried out at (360-420)° C. and (220-300) bar, with 20-30 minutes of contact time and is at the demonstration stage of development. A further process at a good degree of development is the TCC process developed by the University of Illinois which is carried out at (295-305)° C., 180 bar and (15-minutes of contact time (2001 THERMOCHEMICAL CONVERSION PROCESS OF SWINE MANURE: OPERATING TEMPERATURE AND RETENTION TIME EFFECTS vol. 43(6): 1821-1825 American Society of Agricultural Engineers).

It can be inferred that the liquefaction technology has been effectively demonstrated on a pilot scale, on different substrates, but that many of these processes have been stopped due to critical technological factors and problems of economic and environmental sustainability, highlighting the need for innovative and reliable alternative schemes for managing the conversion of organic waste, especially OFMSW and co-produced currents.

The "CatLiq" technology has reached the phase of construction of a plant called "Pre-Commercial Demonstration Plant", in Balikesir in Turkey for 15 t/h. This phase began after the operation of a 60 kg/h pilot plant. In a recent presentation at a conference (https://bioenergy.conference-series.com/abstract/2017/catliq-catalytic-hydrothermal-liquefaction-process-from-pilot-scale-to-demo-scale—7th International Congress on Biofuels and Bioenergy Oct. 2-4, 2017 Toronto, Canada), it is explained that continuous pilot management has been limited by the fact that the process fluids produced scale, clogging and flows of particles.

The liquefaction water treatment is performed by membrane systems without biogas production as described in WO 2006/117002. The "Cat-HTR" technology has been under development since 2008 and is ready for the construction of the first commercial plant (2019), with plastic feeding and capacity 1420kt/y (http://www.licella.com.au/facilities/).

In this process, the water produced is not treated to recover biogas.

Literature reports on a study to treat waters produced in hydrothermal liquefaction by anaerobic digestion to form biogas (Chen et al. Water Research 106 (2016) 98-107). In the article, it is shown that under anaerobic mesophilic digestion conditions (37° C.) and in 5 days the waters produced by the liquefaction of rice straw were 48% biodegradable. Intervening with a preliminary stage of extraction with light petroleum, it is possible to increase the biodegradability of the residual COD by a further 25%, which suggests behaviour recalcitrant to the digestion of the products present, so in this specific case use of a solvent extraction system is proposed. The solvent system is, however, a costly one to manage.

The liquefaction of *spirulina*-type algae produces an aqueous phase with 85 gCOD/l (Zheng et al. Energy Conversion and Management (2016), Zheng, Mingxia et al. Anaerobic Digestion of Wastewater Generated from the Hydrothermal Liquefaction of *Spirulina*: Toxicity Assessment and Minimization. DOI: j.enconman.2016.10.034) and similarly to other works on algae (Giovanna Tommaso et al. Bioresource Technology 178 (2015) 139-146) under the most effective conversion conditions a 43% conversion was achieved of the initial COD. Results of the same level as the previous ones were also obtained by converting liquefaction waters from algae (*Nannochloropsis*) starting with 97 gCOD/l and reaching a maximum conversion of 62% of COD in solution by pre-treatment with activated carbon of the liquefaction waters produced (Saravanan R. Shanmugam et al. Bioresource Technology 223 (2017) 115-120). Again, pre-treatment is required to remove recalcitrant substances that inhibit anaerobic degradation. In conclusion, several studies have been reworked in order to obtain the parameters of the experiment with the same units of measurement, and this comparison shows the impossibility of the treatment of the aqueous phase as is, the lack of data on the conversion of biomass such as OFMSW and, for studies on other substrates, the maximum conversion of COD in waters into biogas never higher than 70%.

The existing literature outlines how water from OFMSW liquefaction can actually cause a toxicity problem related to some of the chemical compounds present, such as methyl-hydroxy-pyridines, potentially biodegradable, but characterised by high toxicity to methanogenic micro-organisms (micro-organisms capable of activating the formation of biogas).

As far as patent literature is concerned, there are patents which describe processes in which both the liquefaction of biomass and the anaerobic digestion of the aqueous phase in addition to further unitary operations are carried out. In particular, in the U.S. Pat. No. 9,797,597, an energy integrated process scheme is proposed, which comprises the liquefaction of biomass (also OFMSW) and anaerobic digestion of the aqueous phase produced. In this patent, however, liquefaction is carried out on the digestate (first anaerobic digestion and then liquefaction) and under supercritical conditions at T=400° C. and P=200 Bar. If liquefaction is carried out under supercritical conditions, the energy available in the biomass is not sufficient and therefore it is necessary to use an external energy source. The aqueous phase produced is sent to secondary and tertiary treatments outside the developed scheme. There are no technical indications on how this aqueous phase is treated.

U.S. Pat. No. 9,758,728 describes a combined scheme of hydrothermal liquefaction and catalytic hydrothermal gasification (HTL-CHG). The organic matter in the waters of liquefaction represents at least 40% of the total carbon present in the biomass of origin. The recovery of this organic material and the reuse of the water is a key factor in maintaining high overall transformation efficiency. To process these waters catalytic hydrothermal gasification is introduced under the same operating conditions as hydrothermal liquefaction (HTL): T=(300-360)° C. and 200 Bar pressure in the presence of a catalyst containing a metal chosen from Ru, Rh, Os, Ni, Cu and mixtures thereof. The disadvantage of the proposed scheme is that, in addition to hydrothermal liquefaction conditions close to supercritical conditions, water treatment is also carried out under particularly severe conditions and is therefore extremely costly in terms of investment, building materials and energy consumption.

U.S. Pat. No. 9,404,063 describes a process for the separation of bio-oil from the aqueous phase produced by hydrothermal liquefaction (HTL) through a first stage of separation with precipitation of inorganic compounds and/or mineral solids, followed by a stage of cooling and separation of the bio-oil from the aqueous phase.

U.S. Pat. No. 9,695,093 describes a process for treating agricultural or municipal sewage, which comprises the phase of treating the sewage in a digester to produce a product that contains biogas and sludge. The biogas is separated from the sludge, which is converted by a hydrothermal liquefaction process to form a product of liquefaction and carbon solids.

This reaction has been studied for years but the process has not yet found industrial applications, mainly because of the prohibitive costs associated with the scale-up of equipment to be managed at high pressure (greater than or equal to 200 bar). Moreover, the energy efficiency of the process has been found to be far from the theoretical limit attainable, and, consequently, the energy to be introduced into the process is often higher than that obtained in the products. In this specific case it is proposed to heat the waters obtained from the hydrothermal liquefaction stage to at least 160° C. and then recirculate them. The proposed scheme, while avoiding high energy consumption in the hydrothermal conversion, has high energy intensity for vaporising the entire aqueous phase that is dried to obtain solid carbon compounds.

The liquefaction of organic biomass under supercritical conditions, which typically provide for a temperature range between 370° C. and 400° C. and pressure ranging from 220 bar to 250 bar, involves investment costs and energy costs (due to the need to supply energy from an external source) that are very significant and as such slow down and postpone industrial performance thereof. Biomass liquefaction in subcritical conditions co-produces bio-oil considered as "advanced biofuel", and an aqueous phase with low biodegradability under standard anaerobic digestion conditions resulting in low biogas production. This leads to the need to send the liquefaction waters still loaded with COD to large water treatment plants, with increased disposal costs.

The problems that can be found in the anaerobic digestion of liquefaction waters obtained under subcritical conditions are various.

First of all, the presence or formation of compounds that inhibit anaerobic digestion is observed:

substances that act by slowing down the process or inhibiting the growth of microorganisms responsible for the degradation of substances present or intermediates derived from them, such as nitrogen and salinity.

In addition, the presence is observed of compounds that are difficult to biodegrade anaerobically or specific toxic compounds and metabolic products derived from digestion itself: compounds that have molecular structures that are not similar to those of natural substances, which are decomposed with difficulty, slowly (through non-dedicated co-metabolism) or not at all.

In greater detail, in the aqueous phase from the liquefaction of organic biomass there are some specific chemical compounds (e.g. methyl-pyridine) that are potentially biodegradable but characterised by an extremely high toxicity to methanogens. In addition, the aqueous phase is characterised by a usually high nitrogen to carbon (N/C) ratio and, after anaerobic digestion, by a relatively high pH, and for this reason the role of ammonia and of the inhibitions deriving from the same is important.

SUMMARY OF THE DISCLOSURE

In order to overcome the identified problems, which involve a limited COD removal capacity and consequent low conversion to biogas of the COD present in the waters themselves, the Applicant has developed a different mode of managing anaerobic digestion of such waters defined through a multiple-stage reaction. In this way it is possible to integrate the liquefaction of the biomass under subcritical conditions (240° C.-310° C.) with the production of liquid fuel, preferably bio-oil, and the recovery of the COD present in the aqueous phase with high biogas efficiency. Bio-oil and biogas are both, given the origin of the biomass, classifiable as "advanced biofuels".

The Applicant has found a process for the production of liquid fuel, preferably bio-oil, and of a gaseous fuel, preferably biogas, from biomass, preferably organic waste and scrap, more preferably the organic fraction of municipal solid waste resulting from separate collection (OFMSW), even more preferably the wet fraction, and mixtures thereof, with the aim of maximising the exploitation of biomass, and with the aim of obtaining a high conversion of said charge to "advanced biofuel" with high energy efficiency.

Said process comprises the following steps a. deliver biomass, preferably refuse and waste of organic origin, more preferably the organic fraction of municipal solid waste resulting from separate collection (OFMSW), even more preferably the wet fraction, and mixtures thereof, at a pre-treatment section to form a homogeneous phase that can be moved and/or pumped, in which the following operations are carried out:

the inert parts are separated (e.g. stones, glass, iron and other inert solids) from the biomass;

the biomass is shredded and/or ground to reduce its size and so that it can be moved and/or pumped, forming a homogeneous phase;

b. said homogeneous phase obtained by pre-treatment (a) is subsequently subjected to subcritical hydrothermal liquefaction at a temperature between 240° C. and 310° C. to form a liquefied phase;

c. said liquefied phase coming out of the liquefaction (b) is subsequently subjected I. to a physical separation by different density or dynamics, preferably by decantation or centrifugation, obtaining a first aqueous phase, a gaseous phase, which is sent into the atmosphere after treatment, an oily phase which is subsequently separated into a bio-oil, and a solid residue, which can be classified as a secondary solid fuel (SSF); or II. to a separation by different size, preferably filtration, so as to remove a solid residue from a mixed phase, which contains a gaseous fraction, an aqueous fraction and an oily fraction;

d. after separation, the process continues in two alternative and mutually exclusive modes as follows:

a.1 in the first mode the first aqueous phase obtained in (I) is subjected to a multiple-stage anaerobic reaction from which biogas, anaerobic sludge and a second aqueous phase are produced;

after said anaerobic reaction, said second aqueous phase is then subjected to an aerobic reaction to obtain water that is used for irrigation or feeding into surface bodies of water (rivers, lakes); and the oily phase coming out of the separation by different density is then separated into a bio-oil and a solid residue.

b.1 in the second mode said mixed phase is then subjected to a separation by different density or dynamics, obtaining a first aqueous phase, bio-oil and a gaseous phase, which is sent into the atmosphere after treatment;

then, said first aqueous phase is subjected to a multiple-stage anaerobic reaction from which biogas, a muddy current and a second aqueous phase are produced;

said second aqueous phase is subsequently subjected to an aerobic reaction to obtain water that is used for irrigation or feeding into surface bodies of water.

The process described and claimed offers the technical advantage of increasing the conversion of the biomass to advanced biofuel, thanks to the conversion to biogas of the organic substance present in the waters of liquefaction. The conversion to biogas is interesting when the organic substance present in the liquefaction waters is measured in terms of COD between 50 and 200 g/litre.

BRIEF DESCRIPTION OF THE DRAWINGS

Further objects and advantages of this disclosure will be made clearer by the following description and the accompanying drawings, given purely by way of a non-limiting example, which show preferred embodiments of the present disclosure.

FIG. 1 shows the following units, which make up the process:

[1] is the biomass pre-treatment unit (a) that forms a homogenised phase (b) and waste (o);

[2] is the liquefaction unit that forms a liquefied biomass (c);

[3] is the separation unit, for example centrifugation or decantation, that separates the liquefied substance into gas phase (n) (mainly $CO_2$), the first aqueous phase (d) and the oily phase (e);

[4] is the multiple-stage anaerobic reactor which produces biogas (m), a second aqueous phase (i) and anaerobic sludge (h);

[5] is the aerobic reactor that purifies the second aqueous phase (l) to a quality compatible with the feeding into surface bodies of water;

[6] is the filtration unit that separates bio-oil (f) from a solid residue (g).

Figure 1:
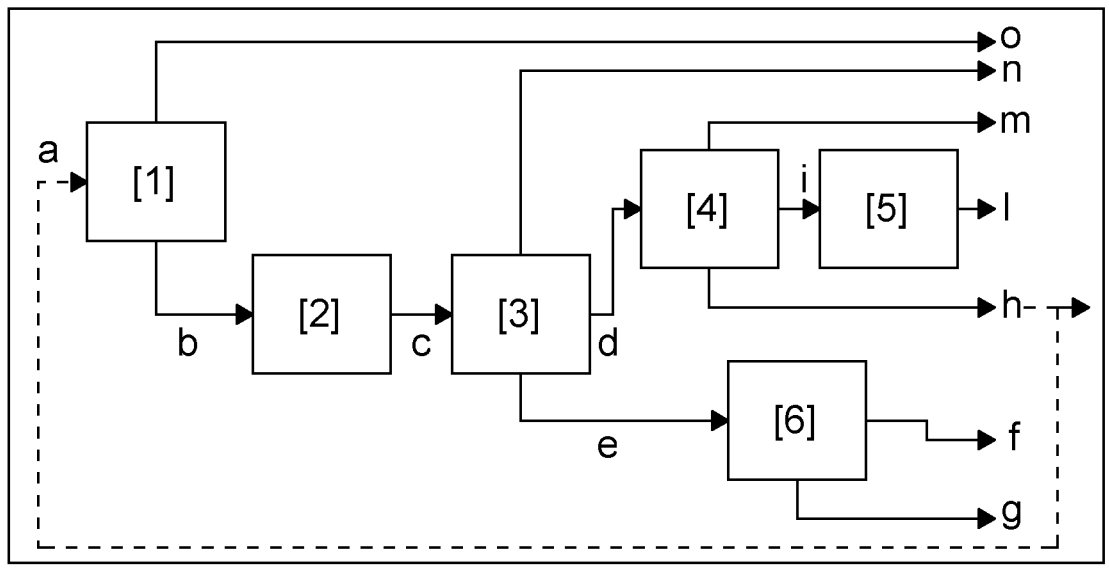
FIG. 1 illustrates a preferred embodiment of the process that is the subject of this patent application according to the first method.
Figure 2:
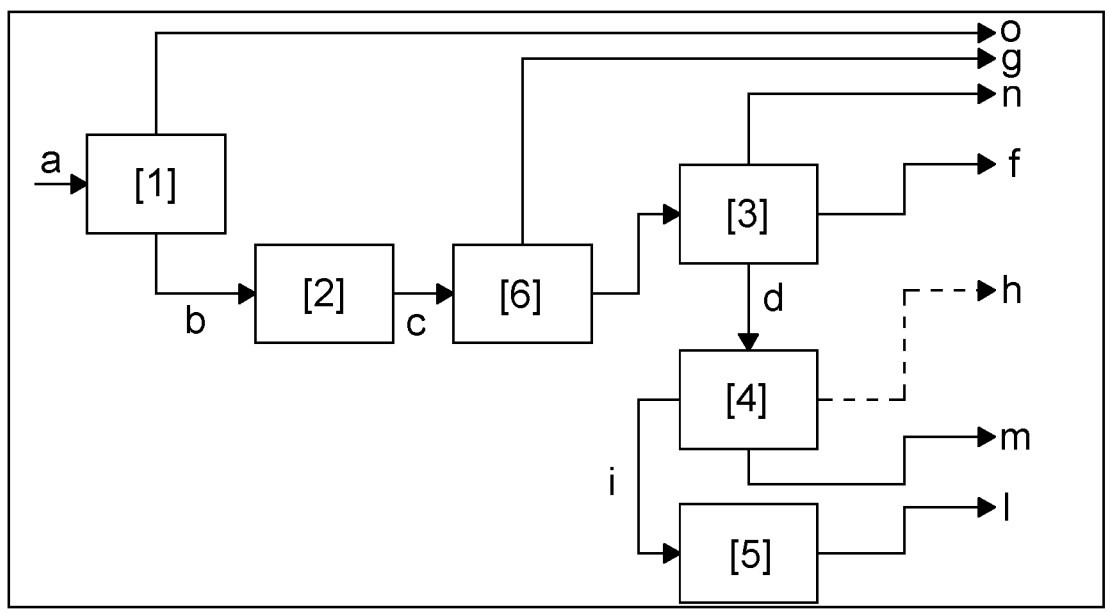

FIG. 2 also illustrates a preferred embodiment of the process that forms the object of the present patent application according to a second mode. FIG. 2 shows the same unitary operations as FIG. 1 but unitary operations [3] and [6] are reversed.

Figure 3:
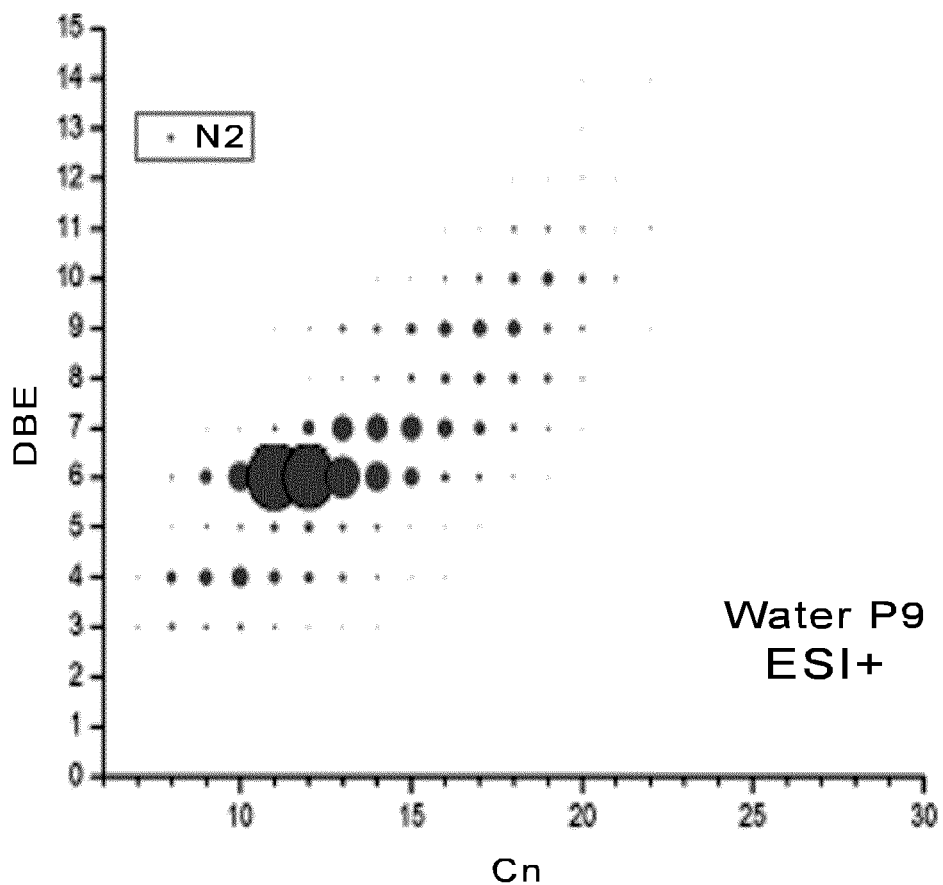

FIG. 3 shows the water as it is analysed by the ESI-FTICR MS technique in high resolution as explained in the comparative example 1.

Figure 4:
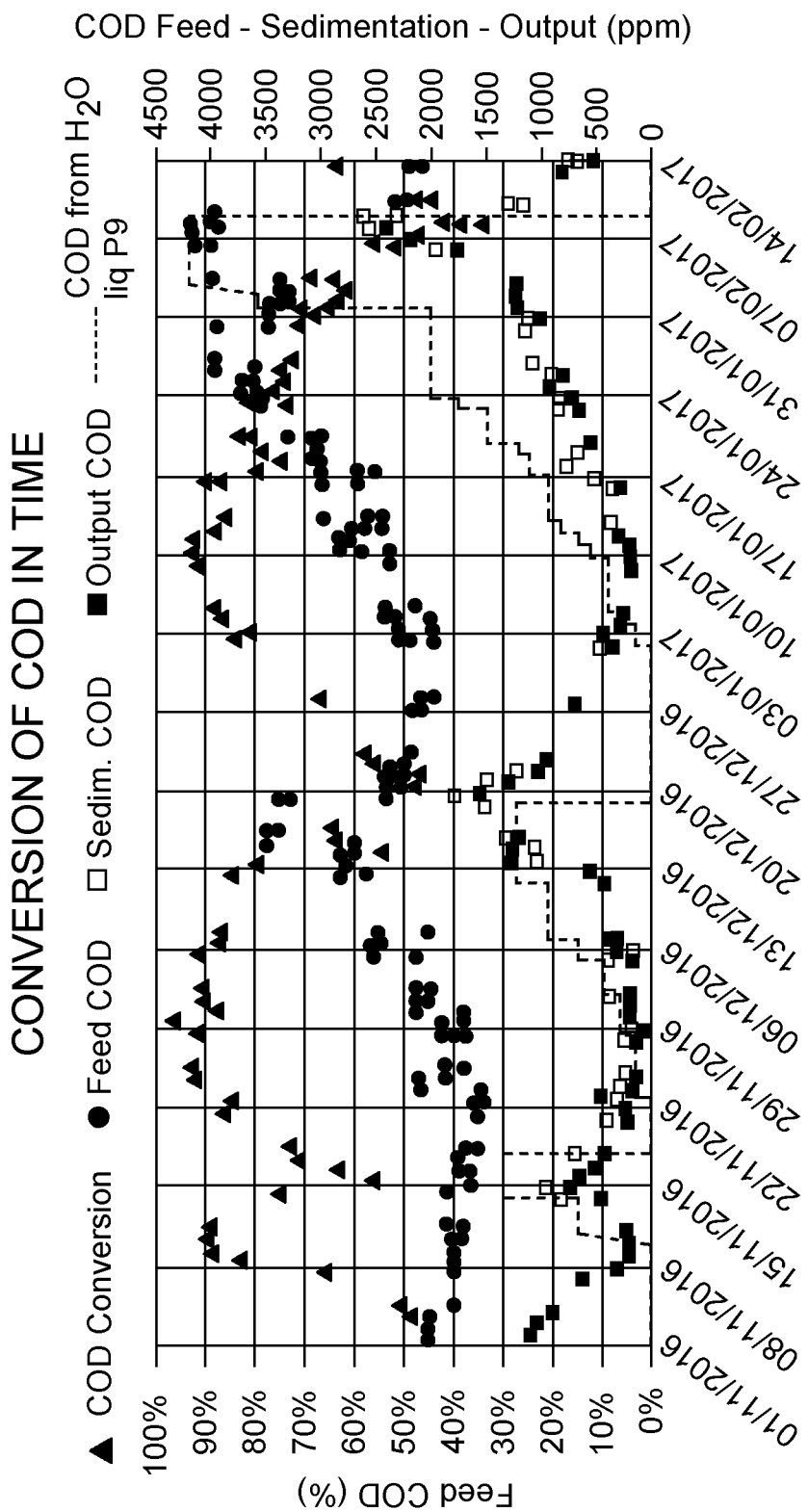

FIG. 4 shows the conversion of COD over time. The conversion of the COD, the COD of the water fed to the anaerobic reactor, the outgoing COD from the sedimentation tank located downstream of the reactor and the outgoing COD from the reactor are reported. The graph in FIG. 4 (black dotted line) shows the % of COD fed due to the contribution of liquefaction water in relation to the total. Total COD is the sum of COD from liquefaction waters and sucrose. The settler is an accessory volume, present in the equipment used in the example, to facilitate the clarification of the water coming out of the reactor and thickening the sludge as a heavy phase and recirculate it to the reactor.

Figure 5:
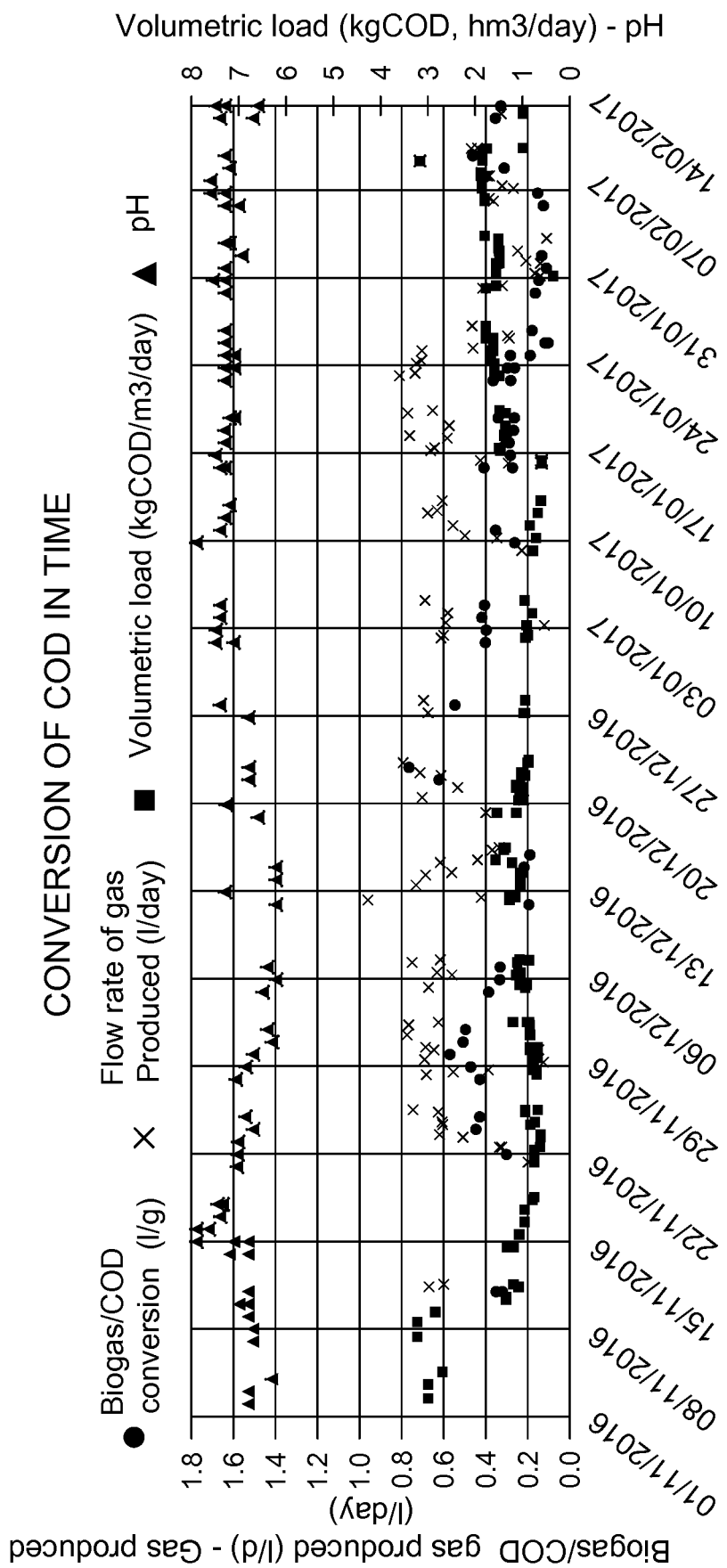

FIG. 5 shows the production of biogas over time. The graph shows the trend of the ratio between biogas and converted COD, in terms of litres/gram; the trend of the flow rate of gas produced in terms of litres/day; the trend of the volumetric load of the reactor in terms of kg of COD per cubic metre of reactor per day; the pH trend.

Figure 6:
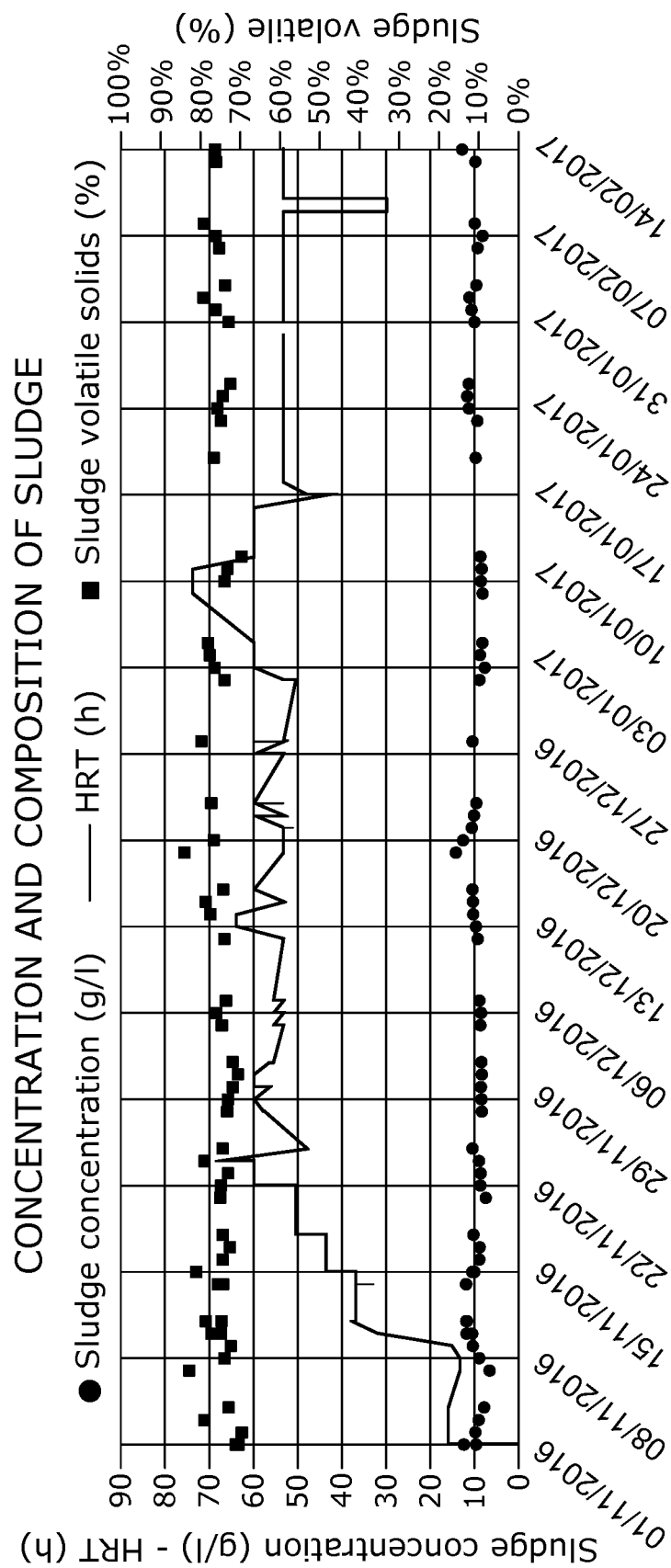

FIG. 6 shows the concentration and composition of the sludge over time. The graph shows the trend in the concentration of sludge in terms of grams per litre of aqueous phase; the trend of the hydraulic retention time of the reactor in terms of hours; the trend of the ratio between volatile solids and total solids of the sludge in terms of percentage by weight.

Figure 7:
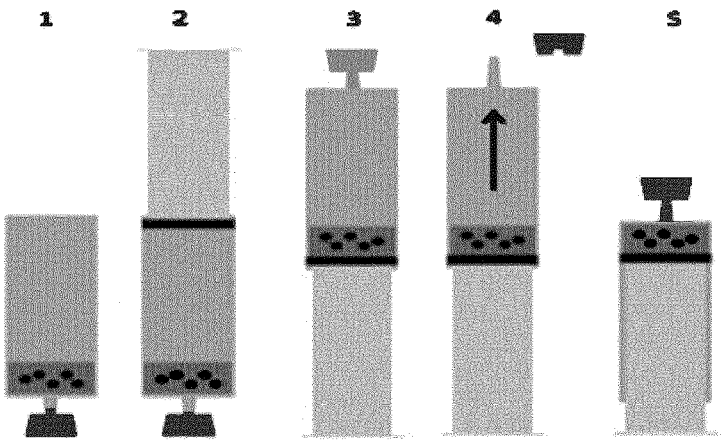

FIG. 7 shows the modes of performance of test 25 in Example 2.

Figure 8:
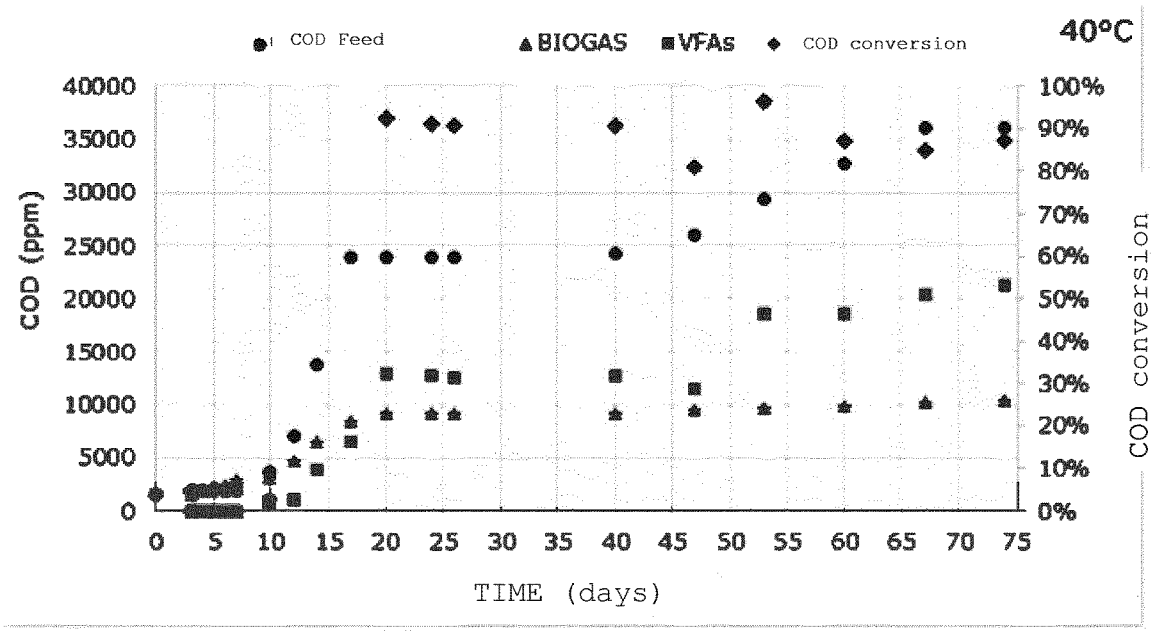

FIG. 8 shows the conversion of the COD over time at 40° C. The graph shows the trend of the COD fed to the reactor, the overall conversion of the COD; the amount of COD that has been converted into biogas. Under these conditions, the COD has been converted mainly to volatile fatty acids (VFAs), showing the phenomenon of intoxication of the methanogenic communities observed during the treatment of the aqueous phase as is in a conventional reactor.

Figure 9:
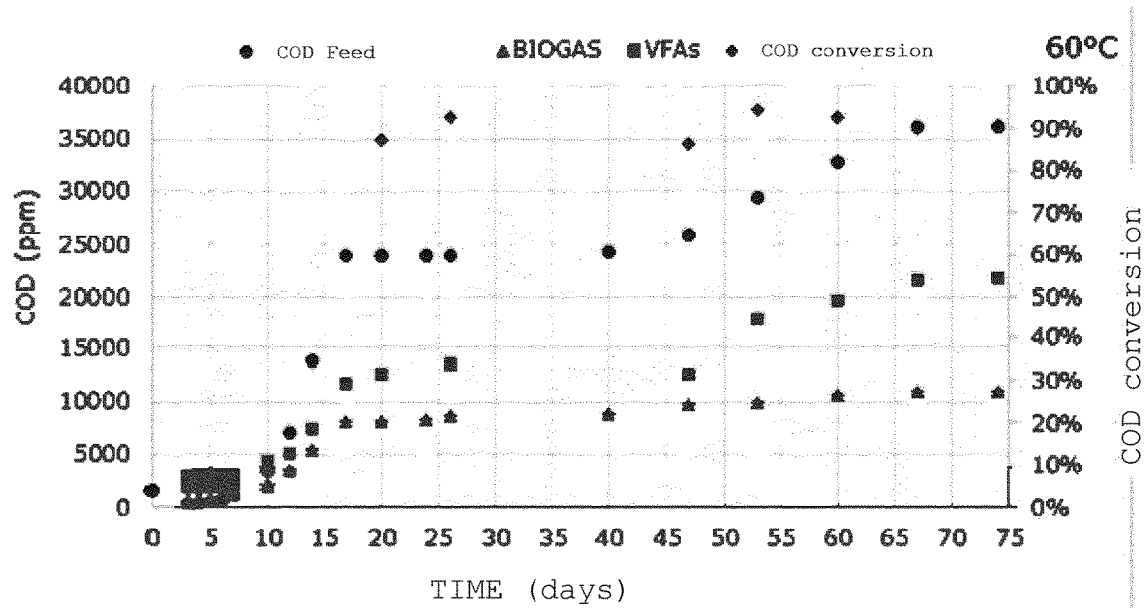

FIG. 9 shows the conversion of the COD over time at 60° C. in the first stage of anaerobic reaction. The graph shows the trend of the COD fed to the reactor, the overall conversion of the COD; the amount of COD that has been converted into biogas; the amount of COD that has been converted to VFAs.

Figure 10:
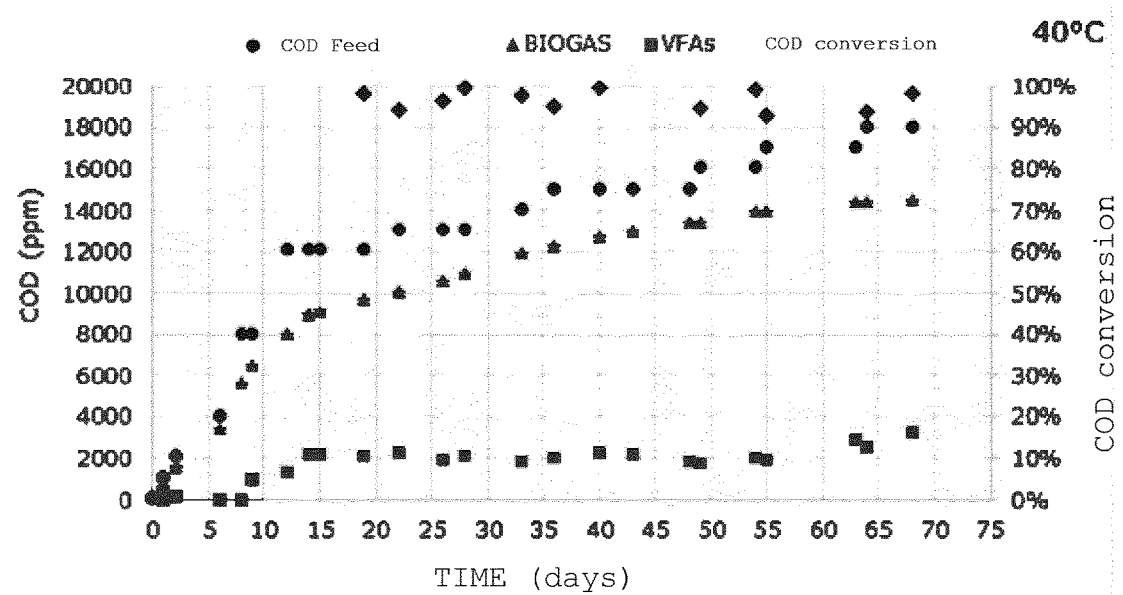

FIG. 10 shows the conversion of the COD over time at 40° C. in the second stage of anaerobic reaction. The graph shows the trend of the COD fed to the reactor, the overall conversion of the COD; the amount of COD that has been converted into biogas; the amount of COD that has been converted into VFAs.

Figure 11:
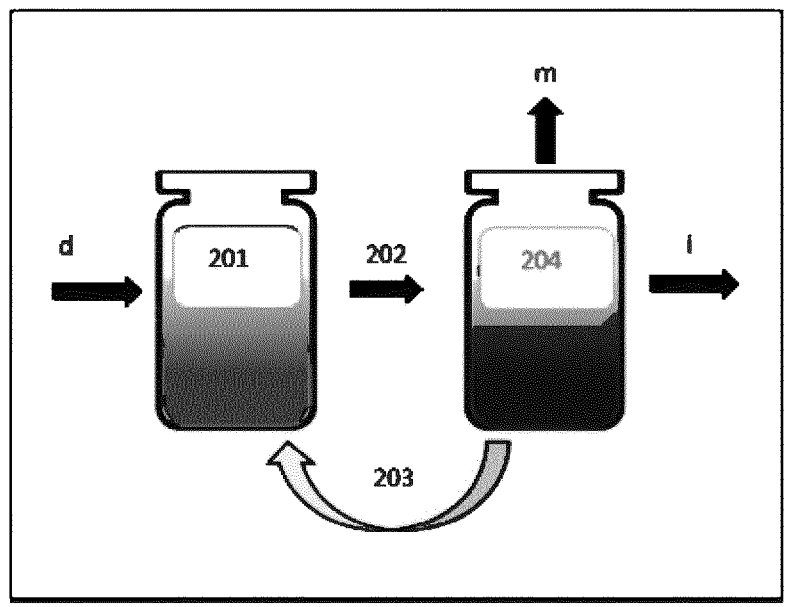

FIG. 11 illustrates the mode of performance of the test of example 3 in which (d) is liquefaction water, [201] is the acidogenic reactor at 60° C., [202] are the VFAs, [204] is the methanogenic reactor at 40'C, [203] is the recirculation of the reactor effluent, (m) is biogas and (i) is the treated wastewater.

Figure 12:
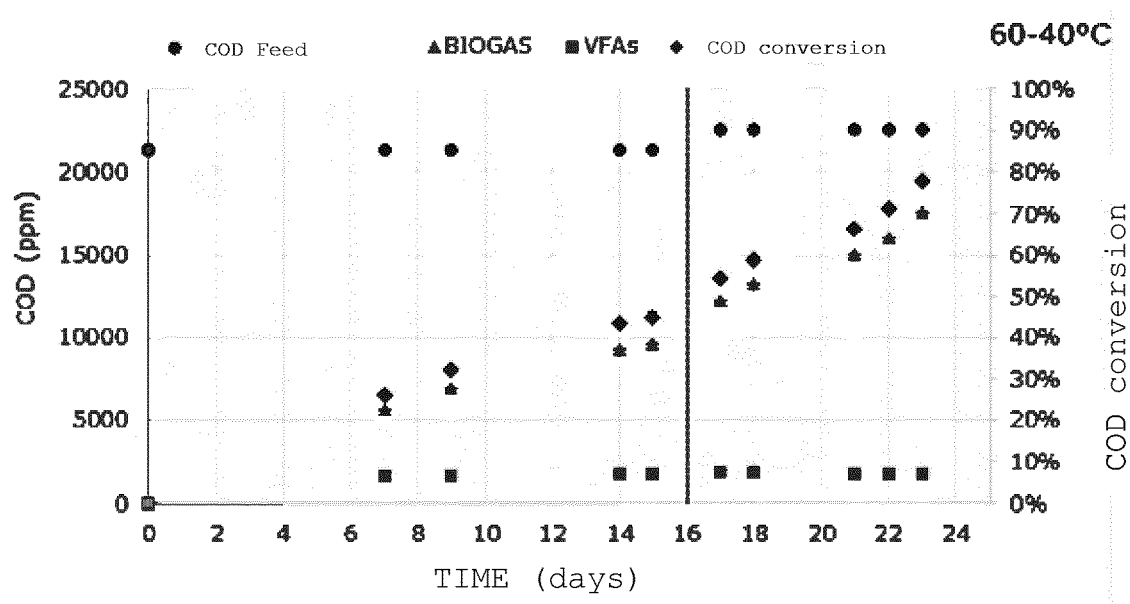

FIG. 12 shows the conversion of COD over time at 40° C. in the second reaction stage. The graph shows the trend of the COD fed to the reactor, the overall conversion of the COD; the amount of COD that has been converted into biogas; the amount of COD that has been converted into VFAs.

Figure 13:
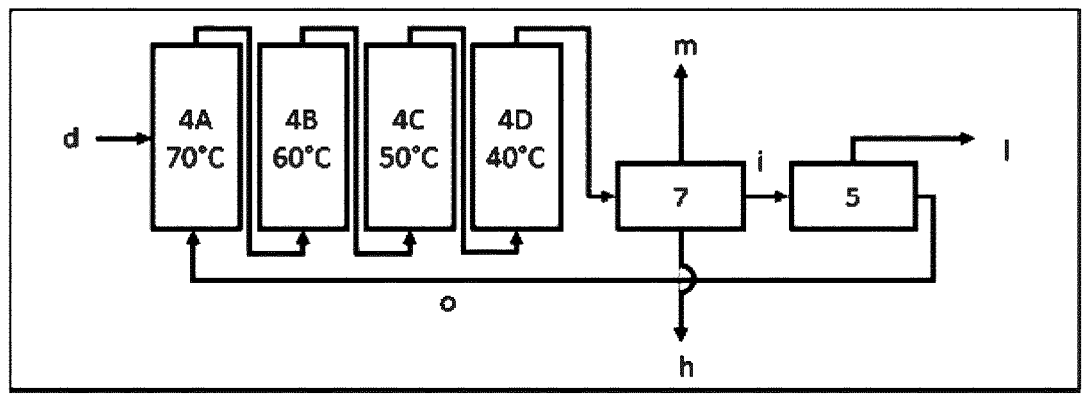

FIG. 13 shows the basic functional elements required for liquefaction water treatment (d) and obtaining biogas (m). The system consists of anaerobic digestion reactors placed in series (4A, 4B, 4C, 4D), which in turn are compartmentalised and maintained at decreasing temperature (70° C., 60° C., 50° C., 40° C.). At the end of the anaerobic digestion reactors, a separation system (7) is placed that separates a solid digestate (h), a biogas (m) and a liquid (i) that is treated in a tank for aerobic digestion (5) for further purification (l) and partially recirculated (o) at the beginning of the system to dilute the water flow (d) entering the first anaerobic reactor.

Figure 14:
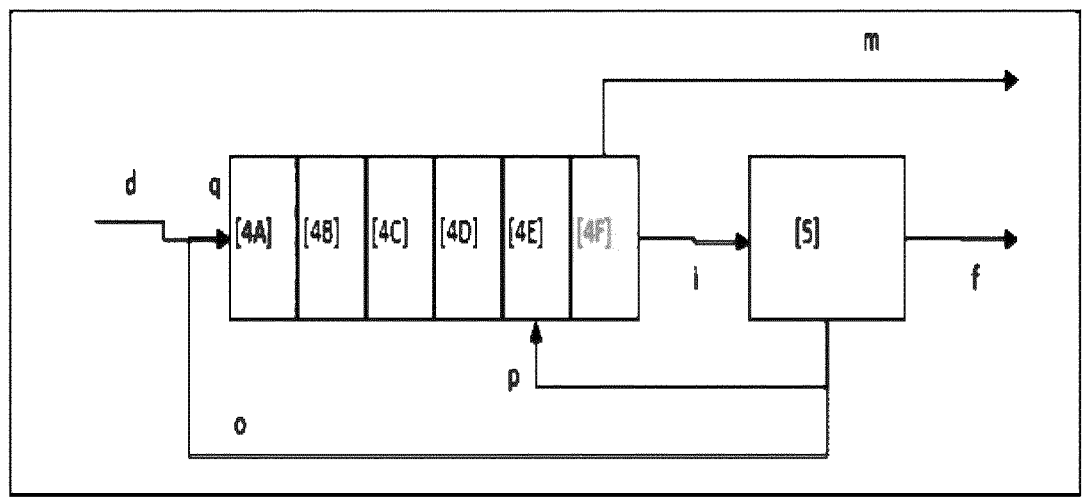

FIG. 14 describes the anaerobic digestion phase and the aerobic digestion phase according to a preferred embodiment of the present disclosure. The first aqueous phase (d) is pumped into a multiple-stage reactor consisting of a series of anaerobic stages in series [4A, 4B, 4C, 4D, 4E, 4F] containing suspended bacterial biomass. From the anaerobic reactor, the current (m) comes out, consisting of biogas, the current (i) said defined second aqueous phase that feeds the aerobic digestion reactor [5]. The purified aqueous stream (f) flows out of the aerobic digestion reactor. From the aerobic digestion reactor, at least part of the purified water can be recirculated (o) and mixed with the first aqueous phase to form the current entering the anaerobic reactor (q). Alternatively, at least part of the purified water may be recirculated (p) at the start of the methanogenic stage of the anaerobic reactor.

DETAILED DESCRIPTION OF THE DISCLOSURE

The process that is the object of this patent application is now described in detail.

In this patent application, by energy efficiency the Applicant intends the ratio between the sum of the calorific values of the process products, such as the liquid and gaseous fuels produced, and in particular bio-oil and biogas, and the calorific value of the biomass, introduced as feedstock in the process described and claimed.

In this patent application, conversion is understood to mean the ratio by weight of the sum of the weight of the bio-oil produced and the weight of the biogas produced and the feedstock dry weight.

The European Community imposes the obligation to introduce components of biological origin in the preparation of fuels or in the production of electricity. The current regulatory framework for biofuels derives from the regulations Fuel Quality Directive (FQD 2009/30/EC) and Renewable Energy Directive (RED 2009/28/EC). Among the main interventions, the RED 2009/28/EC imposes the obligation by 2020 to introduce "components of biological origin" into conventional fossil fuels up to 10% of calorific value. The regulatory framework is still evolving: in particular, to date, a proposal is under discussion to introduce a maximum limit of 7% for biofuels from first generation sources, i.e. sources competing with food (e.g. palm oil, rapeseed, soybean, etc.) and to introduce a minimum quantity of advanced biofuels.

In this text, "advanced biofuels" are understood to mean liquid and gaseous fuels derived from sources that do not compete with the production of food, such as organic material derived from the separate collection of municipal solid waste, because it has a critical mass that justifies applications on an industrial scale and makes them cost-effective. In the present text, the term "biomass" refers to the following elements or mixtures thereof:

Municipal solid waste of organic origin, which may be chosen, for example, from organic material resulting from the separate collection of waste, organic material sorted from mixed municipal solid waste, the organic fraction of the municipal solid waste resulting from collection (also known as OFMSW), school and company canteen waste or mixtures thereof; or mixtures of said organic material with pruning cuttings and/or agricultural residues;

primary and secondary sludges of a biological nature produced in wastewater treatment plants;

residues and/or waste from farming and/or animal husbandry;

residues and/or waste from the farming and food industry, the packaging industry and large food retailers;

residues and/or waste from agricultural processing, forestation and/or forestry;

microalgae and/or macroalgae;

bacterial biomass, cyano-bacteria or other microorganisms such as yeasts and moulds.

In the present patent application, all the operating conditions stated in the text are to be considered as preferred conditions even if not expressly stated.

For the purposes of the present disclosure, the terms 'comprise' or 'include' also cover the terms 'consist of' or 'essentially consist of'.

For the purposes of the present disclosure, interval definitions always include extremes unless otherwise specified.

The term 'comprising' and its derivatives do not intend to exclude the presence of any additional component, step or process, whether or not they are disclosed in the present text. To avoid any doubt, all the processes claimed in this text through the use of the term 'comprising' may include any additional step unless otherwise specified.

The technologies for the treatment of the organic fraction of municipal solid waste, or assimilated waste or biomass in more general terms, currently used, can be set out in four types, functional to the product to be obtained, which are listed here:

composting plants, aimed at the production of a high-quality organic soil improver intended for the agricultural and horticultural sectors;

systems of aerobic stabilisation or biostabilisation, aimed at the pre-treatment of the organic fraction to minimise the negative effects linked to the presence of putrescible substance in landfills, or at the production of a suitable soil improver for environmental restoration (SOF);

anaerobic digestion plants, aimed at energy recovery with recovery of the organic fraction as biogas and as biomethane;

heat treatments aimed at recovering material and energy.

The heat treatments differ from the technologies mentioned above for the product potentially obtainable and for the investment required, as this is generally more relevant.

Among the heat treatments the following can be listed:

incineration, where the feedstock is converted into heat and electricity;

gasification, wherein the feedstock is transformed into synthesis gases and therefore potentially into all derivatives thereof, including diesel through the Fischer-Tropsch synthesis (FT);

pyrolysis, where the feedstock is transformed into bio-oil (liquid fuel);

liquefaction, wherein the feedstock is transformed into bio-oil (liquid fuel).

In composting and in aerobic stabilisation, part of the organic component of the biomass is lost and transformed into $CO_2$ and $H_2O$, with a negative impact on $CO_2$ emissions into the environment. In anaerobic digestion, the organic component is transformed into biogas, i.e. $CO_2$ and methane, with times of several weeks. Only with a heat treatment such as gasification combined with Fischer-Tropsch synthesis, pyrolysis or liquefaction, can the organic component be converted into a bio-liquid precursor of "advanced biofuels".

Among the heat treatments mentioned above, liquefaction can be carried out at a lower temperature and can therefore have an economic advantage over competing thermal technologies. In particular, if it is carried out under subcritical conditions, i.e. at temperatures in the range (240-310)° C., the energy needed to manage the process is that present in the biomass and it is not necessary to introduce external energy sources. Liquefaction results in the formation of a large quantity of wastewater, containing a significant portion of the organic substance present in the biomass of origin and most of the nutrients (nitrogen and phosphorus). In addition, these waters contain large amounts of compounds that result in a strong inhibition of anaerobic digestion. This first aqueous phase, as such, cannot be returned into the environment and must be further treated, typically by sending to wastewater disposal centres with high disposal tariffs related to the high content of Chemical Oxygen Demand (COD), which characterises them.

COD is a common parameter of use in water treatment and represents the quantity of $O_2$ (oxygen) required to bring to full combustion ($CO_2$, $H_2O$, $SO_2$, $NO_2$) the organic substance present in the aqueous phase. The COD is typically expressed in g of $O_2$ per litre of aqueous phase and is determined by titration with hexavalent chromium ($Cr^{6+}$).

The literature concerning the treatment with anaerobic digestion of liquefaction waters is quite recent. None of the studies is directly related to the sub-critical liquefaction water treatment of the organic fraction of municipal solid waste (OFMSW), while a large number of experiments can be found on the treatment of waters from liquefaction of biomasses such as microalgae and lignocellulosic substrates.

COD values of water around 50-150 $g_{COD}/l$ are to be considered typical for this type of current.

Said process produces liquid fuel, preferably bio-oil, and gaseous fuel, preferably biogas, from biomass, preferably organic waste and scrap, more preferably the organic fraction of municipal solid waste that results from separate collection (OFMSW), even more preferably the wet fraction, and mixtures thereof.

Examples of commercial facilities for the purposes of the present patent application are food processing and packaging centres, canteens, restaurants, bars, fruit and vegetable markets (market waste), parks and gardens, mowing and pruning (green fraction).

The process described and claimed can operate in batch, semi-continuous or continuous mode.

The biomass is sent to a pre-treatment section to form a homogeneous phase that can be moved and/or pumped, in which the following operations are carried out.

The inert parts are separated, e.g. stones, glass, iron and other inert solid material, from the biomass; then the biomass is shredded and/or ground to reduce its size, according to the starting size and so that it can be moved and/or pumped to form said homogeneous phase.

The homogeneous phase obtained by pre-treatment is then subjected to subcritical hydrothermal liquefaction at a temperature between 240° C. and 310° C. to form a liquefied phase.

Said liquefied phase coming out of the liquefaction (b) is subsequently subjected to either physical separation by different density or dynamics (I), preferably centrifugation or decantation, or separation by different size (II), preferably filtration.

Physical separation by different density or dynamics produces a first aqueous phase, a gaseous phase, which is sent into the atmosphere after treatment, an oily phase, which is then separated into a bio-oil and a solid residue, which can be classified as a secondary solid fuel (SSF).

With a separation by different sizes, a solid residue is removed from a mixed phase, which contains a gaseous fraction, an aqueous fraction and an oily fraction.

After separation, the process continues in two alternative and mutually exclusive modes.

In the first mode, the first aqueous phase obtained by a physical separation by different density or dynamics (I) is subjected to a multiple-stage anaerobic reaction from which biogas, anaerobic sludge and a second aqueous phase are produced.

After said anaerobic reaction, said second aqueous phase is subsequently subjected to an aerobic reaction to obtain water that is used for irrigation or feeding into surface bodies of water.

The oily phase coming out of the separation by different density is then separated into a bio-oil and a solid residue.

In the second mode said mixed phase obtained with a separation by different size (II) is then subjected to a separation by different density or dynamics, obtaining a first aqueous phase, bio-oil and a gaseous phase, which is sent into the atmosphere after treatment. Then, said first aqueous phase is subjected to a multiple-stage anaerobic reaction from which biogas, a muddy current and a second aqueous phase are produced. Said second aqueous phase is then subjected to an aerobic reaction to obtain water that is used for irrigation or feeding into surface bodies of water.

Multiple-stage anaerobic digestion can be carried out by passing the first aqueous phase coming out of liquefaction into multiple reactors in series, or by passing through a single reactor which comprises in its interior several stages with spatial segregation of the suspended bacterial biomass. Anaerobic digestion treatment may be carried out in reactors known in the art, provided that they maintain the above-mentioned spatial segregation of the suspended bacterial biomass (active sludge). These reactors can also be of the UASB type (Up-flow Anaerobic Sludge Blanket Reactors), fixed bed reactors, fluidised with expanded bed, stirred by mechanical actions or membrane, with adhered or supported biomass.

The number of stages of the anaerobic reactor may be greater than or equal to two, preferably ranging from 3 to 6.

Hydrothermal liquefaction must be carried out in subcritical conditions at a temperature between 240° C. and 310° C., and at a pressure that maintains the aqueous phase condensed, preferably between 40 bar and 110 bar. More preferably the liquefaction temperature varies between 280° C. and 300° C., and the pressure varies between 70 bar and 110 bar.

By liquefying under subcritical conditions and integrating the anaerobic digestion of the liquefaction waters in multiple stages, it is possible to increase the conversion of the high COD present in the liquefied waters into biogas, with respect to performing an anaerobic digestion in a single stage of reaction.

The multiple-stage anaerobic treatment allows a high biodegradation of the organic component transferred into the waters with associated production of biogas.

The hydraulic retention time of the aqueous phase entering the anaerobic reactor (total hydraulic retention time for anaerobic digestion) varies from 80 to 800 hours, preferably from 160 to 500 hours.

The hydraulic retention time in the present patent application is defined as the ratio of the volume of the anaerobic reactor to the hourly volume flow rate of the aqueous phase.

The separation of the aqueous phase from the other currents produced by liquefaction is carried out at a temperature between 70° C. and 150° C.

This first aqueous phase can have a COD between 50 g/L and 200 g/L and is located, after the separation mentioned above and optional cooling or heat recovery, at a temperature above or equal to 65° C.

The first aqueous phase can preferably be mixed with a portion of the aerobic reaction effluent in a ratio (first aqueous phase/portion of aerobic reaction effluent) from 1:2 to 1:10 w/w to dilute the COD of the first aqueous phase before being fed to the anaerobic digestion reactor. For example, the ratio 1:2 indicates that for each unit of weight of the first aqueous phase, an equal weight is added of water coming out of the aerobic reactor; the ratio 1:10 indicates that for each unit of weight of the first aqueous phase 9 times the weight of water coming out of the aerobic reactor is added.

The first aqueous phase may be optionally pre-heated by waste heat from the plant, allowing a solution to be obtained at a temperature of at least 60° C., after mixing with part of the aerobic reactor effluent.

The pre-heating operation is particularly useful in the start-up phase of the plant.

The first aqueous phase can also be mixed, as an alternative to the aerobic reactor effluent, with the effluent from the anaerobic acidogenic phase or from the anaerobic methanogenic phase.

Furthermore, mixing can be carried out by recirculation at the entrance to the methanogenic stage of anaerobic digestion part of the aerobic reactor effluent. The mixing ratios will be governed by the relative COD of the different currents.

With reference to FIG. 1, the biomass or in the exemplified case the OFMSW (a) is sent to the pre-treatment section [1] where it is subjected to separation of most of the inert parts, for example stones, glass, iron and other inert solid material, which form the waste (o). The OFMSW, purified of the inert parts, is shredded and ground to reduce the size thereof, in order to obtain a homogeneous phase that can be moved and/or pumped (b). The homogeneous phase is sent to the liquefaction section [2], after passing through a heat exchange unit to bring it to the reaction temperature.

The liquefied OFMSW (c) exits the liquefaction unit [2]), which is then sent to the unit of separation (e.g. by centrifugation or decantation in one or more stages) [3] where a gas phase (n) is separated, mainly $CO_2$, an aqueous phase (d) and an oily phase (e). The aqueous phase (d) is fed to the multiple-stage anaerobic reactor [4] which produces biogas (m), a second aqueous phase (i) and anaerobic sludge (h). The second aqueous phase (i) is fed to an aerobic reactor [5] for further purification (I). The oily phase (e) is separated in [6] into bio-oil (f) and solid residue (g). The anaerobic sludge (h) can be recycled into feed for pre-treatment [1].

The aerobic reactor [5] restores the parameters that allow the recovery of the aqueous phase for irrigation purposes or feeding into surface bodies of water [l].

FIG. 2 shows the same unitary operations as FIG. 1 but unitary operations [3] and [6] are reversed.

The liquefied OFMSW (c) exits the liquefaction unit [2], which is then sent to the separation unit (e.g. filtration) [6] where the solid residue (g) is separated. The remaining phases are fed to a separation unit [3] from which a gas phase (n) is obtained, mainly $CO_2$, a first aqueous phase (d) and bio-oil (f). The first aqueous phase (d) is fed to the multiple-stage anaerobic reactor [4] which produces biogas (m), a second aqueous phase (i) and anaerobic sludge (h). The second aqueous phase (i) is fed to an aerobic reactor [5] for further purification (I).

Referring to FIG. 14, the aqueous phase (d) is pumped into a multiple-stage reactor consisting of a series of anaerobic stages [4A, 4B, 4C, 4D, 4E, 4F] containing suspended bacterial biomass. These stages of reaction are characterised by decreasing temperatures from 65° C. to a final temperature of 38° C., in the last stage, where the temperature can vary in the range between 40° C. and 35° C.

In the first stages of reaction, populated by hyperthermophilic bacterial and thermophilic acidogenic communities, the conversion of the organic substances present in the aqueous solution fed (q) takes place, including the anaerobic digestion inhibitors, into VFAs and other soluble intermediates. In the subsequent stages, populated by mesophilic microbial communities, the conversion of said soluble intermediates into biogas takes place, with the obtaining of a second aqueous phase (i) characterised by a reduced chemical demand for oxygen and a low content of dissolved organic substances. The second aqueous phase is optionally transferred into a storage tank, treated by an aerobic activated sludge process [5] and partially mixed with the aqueous phase of liquefaction [d] entering the first stage of anaerobic digestion.

Aerobic digestion can be carried out according to different ways described in the state of the art, such as, for example, in reactors with biomass in suspension, adhered or supported depending on the selected reactor configuration, with mechanical agitation, external recirculation or other modes known in the art.

The aerobic digestion effluent (f) may be further treated according to processes known in the state of the art depending on the residual content of the components to be obtained, such as for example by contact with activated carbons, ultrafiltration, reverse osmosis or electrodialysis for the removal of the residual salts and by electro-oxidation if a stronger purification is to be achieved. The sludge produced during anaerobic and aerobic digestion can be fed back to the liquefaction reactor together with other biomass after being thickened and possibly further concentrated, for example by filter-pressing or centrifugation. Alternatively, it can be dehydrated and sent, for example, to a composting plant.

The liquefaction waters contain significant amounts of elements, such as nitrogen, phosphorus, iron and trace elements which act as nutrients for the activated sludges (anaerobic and aerobic bacterial biomass) and allow the growth thereof. If the situation occurs in which in the first aqueous phase these compounds are deficient, it is necessary to dose them in the waters treatment section, as known to the person skilled in the art.

The multiple-stage anaerobic reactor can be operated in a continuous or batch management mode. The continuous management mode is adequate and suitable for water flows to be treated of industrial interest, the batch or semi-continuous management mode is of interest for laboratory scale. As described in the block diagram in FIG. 14, for Example 4, where 10 m³/h of aqueous phase with COD 130 000 mg/kg (d) at the temperature of 90° C. are produced by liquefaction. The liquefaction waters are mixed with 40 m³/h of waters coming out of the aerobic digestion stage (o) characterised by a residual COD of around 150 mg/kg, forming a current diluted with COD of approximately 26 000 mg/kg (q). The current (o) is called long recirculation. The dilution ratio of the proposed scheme is 1:4. The total volume of the anaerobic reactor is 12000 m³ resulting from the sum of 6 contiguous volumes, separated spatially by bulkheads, but connected below by a passage hole and at the top by alternating pitch. This allows the sludge to be kept, which must necessarily pass through the different volumes in a descending (downflow) and then ascending way (up-flow) preferably in the ascending section. Each segregated volume is equal to 2000 m³. The first 4 volumes work with acidogenic sludge and the hydraulic retention time in the 4 acidogenic reactors is overall little more than 5 days. After the fourth anaerobic acidogenic stage, in Example 4, the aqueous phase, whose COD has been converted into volatile acids, passes to the volumes in which the methanogenic sludge is contained and where the aqueous phase remains for a total hydraulic retention time in the two reactors of just under 3 days. It is possible optionally to perform a second dilution with the aim of lowering the COD from volatile acids to lower values. The dilution current (p) coming from the aerobic digester and fed to the first reactor with methanogenic sludge [4E] is defined as short recirculation. The current leaving the aerobic stage (f) has a residual COD compatible with the discharge into surface waters (In Italy, the limit emission values for surface waters and in drains are defined in Legislative Decree 152/06 and subsequent amendments (Part Three, Annex 5, Table 3 of the Decree).

The anaerobic digestion reactor is populated by different microbial communities. The first aqueous phase coming from subcritical liquefaction (d) is anaerobically digested sequentially in compartments characterised by different temperature and by different bacterial populations. In the first stages, maintained in conditions of hyperthermophilia-thermophilia at temperatures between 70° C. and 55° C., there is an acidogenic bacterial community that converts the dissolved organic compounds, including compounds with high inhibitory potential, into volatile acids. In the subsequent stages, maintained at mesophilia temperatures, at a temperature between 40° C. and 35° C., there is a methanogenic microbial community that converts said volatile acids into methane, producing a treated effluent characterised by a level of COD lower than the input one.

In the process described and claimed the anaerobic biomass in suspension can have a concentration varying between 5 and 50 g/l, preferably between 7 and 15 g/l.

In the process described and claimed, the dwell time in each stage (acidogenic and methanogenic) of the multiple-stage reactor varies between 1 and 14 days, preferably between 2 and 8 days.

The volumetric load of the reactor in terms of kgCOD/m³/day varies between 0.5 and 5, preferably between 1 and 4 kgCOD/m³/day.

A further embodiment according to the present disclosure is the use of biogas to produce electrical current, for distribution in the network for domestic and industrial purposes after eliminating the carbon dioxide content. A further embodiment according to the present disclosure is the use of bio-oil in the production processes of biodiesel and green diesel.

A description is now given of some examples of the applications of the present disclosure which have a purely descriptive and non-limiting purpose and which represent preferred embodiments according to the present disclosure.

EXAMPLES

Comparative Example 1: Liquefaction of the Organic Fraction of Municipal Solid Waste (OFMSW) and Single-Stage Liquefaction Waters Anaerobic Digestion Liquefaction was carried out in a pilot plant with continuous operation. The pilot plant provides for the feeding of feedstock coming from the organic separate collection of municipal solid waste to a homogenisation unit consisting of a blade mill and a turbine in order to obtain a cream-like product with particles smaller than 5 mm. The homogenised product is pumped at a constant flow rate of 2 kg/hour in a reactor of the nominal volume of 9 litres, of the completely mixed type (CSTR), where the reaction takes place at 280° C., 80 atm, with 2 hours of dwell time. Heating is carried out by means of a diathermic oil which circulates in the jacketed tube for feeding to the reactor, in the reactor jacket itself, as well as in the oil-fired control unit. The reactor is operated under constant pressure. At the head of the reactor, the gaseous current is separated and its flow rate measured. The passage of the reaction effluent, in a 100-micron filtering unit and then in a 20 μm second one, allows the segregation of the solid residue, quantified at the end of the test. The condensed current is collected in a final tank at a temperature of 90'C placed on a weighing cell, where the bio-oil (light phase) is separated from the water phase (heavy phase), which is completely unmixed.

For analytical purposes, a portion of the homogenate (6 g) was dried in an oven to determine its dry weight, which was found to be 26.2% by weight. The composition of the homogenate as is and dried is in Table 1. The lipids were determined by extraction with solvent from the dried biomass and quantified by weight, the ash by calcination at 600° C. in air. The proteins were determined by multiplying by 6.25 the elemental N content (% weight) of the dried charge. The carbohydrates were estimated by difference.

TABLE 1

| RSU-4 | Lipids (%) | Carbohydrates (%) | Proteins (%) | Ash (%) | Water (%) | Total (%) |
|---|---|---|---|---|---|---|
| As is | 5.6 | 12.4 | 6.5 | 1.9 | 73.8 | 100 |
| Anhydrous | 21.1 | 47.1 | 24.5 | 7.3 | 0 | 100 |

A gas phase sampling was carried out for the successive analyses, which confirmed a composition for more than 95% of $CO_2$, and a portion of the aqueous phase (10 ml) sampled for analysis (analysis of total organic carbon —TOC—, sugars and carboxylic acids).

To quantify the bio-oil produced, a solvent is added to the oily phase (ethyl acetate) and then anhydrified with the addition of $Na_2SO_4$ and filtered again; the solvent was evaporated in rotavapor and the bio-oil obtained was weighed. The results are shown in Table 2, in terms of yield % by weight as is ("As Is Yield") or after drying ("Dry Matter Yield").

TABLE 2

|  | Bio-oil (%) | Solid Residue (%) | Aqueous phase (%) | Gas phase (%) |
|---|---|---|---|---|
| As is yield | 5 | 4 | 11 | 5 |
| Dry matter yield | 20 | 18 | 43 | 19 |

As can be seen from the data in Table 2, a large quantity of waste (43% with respect to the dry matter feedstock) is solubilised in the aqueous phase.

The residue at 105° C. of the aqueous phase is 10% by weight, of which the ash at 600° C. was 2% by weight. Table 3 shows the elementary analysis of the residue at 105° C. of the aqueous phase. The supplement at 100%, equal to 19.3%, indicates the presence of inorganic ash, confirming the 2% of ash at 600° C. previously determined on the residue at 105° C. The nitrogen present in the form of ammonium is equal to 3900 mg/kg and the determination of the COD by kit with hexavalent Cr was 125000 mg/kg.

TABLE 3

| C (%) | H (%) | N (%) | S (%) | O (%) |
|---|---|---|---|---|
| 41.3 | 5.4 | 4.9 | 0.2 | 28.9 |

With regard to the characterisation of the aqueous phase: the determination of the acids and sugars was performed by ion chromatography with PA100 column, amperometric detection system and elution in NaOH gradient for sugars, conductivity detection system and isocratic elution of NaOH for the acids.

The analysis of TOC (Total Organic Carbon) in water was performed by measuring the amount of $CO_2$ produced by the oxidation of the organic carbon of the sample.

The sum of the acid compounds and simple sugars (formic acid, acetic acid, propionic acid, butyric acid, mannitol, glucose) of the aqueous phase expressed in terms of TOC (Total Organic Carbon) is equal to 8300 mg/kg against a total TOC value analytically found of 41000 mg/kg. This shows that the aqueous phase contains numerous other organic compounds. The nature of these compounds was estimated, by extraction into $CH_2Cl_2$ and gas chromatography, to consist predominantly of ketones, aldehydes, alcohols, alkylphenols, heterocycles containing nitrogen, alkyl pyrrolidones and diketopiperazine. The water as is was also analysed in dilution 1:1000 in MeOH using the ESI-FTICR MS technique in high resolution 15 (FIG. 2).

A mass spectrum is obtained with thousands of peaks. In addition, compounds containing nitrogen are present in high concentration, in particular those belonging to the classes N1, N2, O1N1, O1N$_2$ (empirical formulas containing these elements in addition to C and H).

From the preliminary processing of the mass spectrum, compounds with two nitrogen atoms can be considered as the most abundant classes in water. Since it is possible to trace back from the empirical formula to the average number of double bonds equivalents (DBE). Given below is a preliminary graph of the number of C atoms, DBE atoms, and relative peak intensity (which can be roughly correlated to concentration) for class N2. The main compounds of class N2 have 6 double bonds equivalents and 10 to 14 atoms of C. More generally, it can be said that most of these compounds are of an aromatic nature. Nitrogen could be present in heteroaromatic cycles or it could be present in the form of amino groups (due to the hydrophilic nature).

The identified compounds are not as readily biodegradable as simple sugars and acids. The main elements of the inorganic component of the liquefaction waters have been determined by ICP/XRF analysis. Table 4 shows two analyses representing the extremes of variability of the quantified elements, in various samples.

TABLE 4

|  | mg/kg | mg/kg |
|---|---|---|
| K | 2300 | 3990 |
| Cl | 1900 | 2500 |
| Ca | 1880 | 2190 |
| Na | 1280 | 2180 |
| P | 1100 | 910 |
| S | 280 | 291 |
| Mg | 188 | 237 |
| Si | 50 | 52 |
| Fe | 33 | 47 |
| Al | 6 | 8 |
| Mn | 3 | 2 |
| Zn | 6 | 5 |
| Sr | 2.0 | 2.7 |
| Ba | 0.6 | 1.0 |
| Ni | 0.5 | 0.3 |

The liquefaction waters produced by OFMSW at 280° C. with 2 hours of contact time were treated in an anaerobic digestion laboratory plant.

The system used works continuously, is composed of a 2 l glass reactor, mixed by magnetic stirring and heated to 35° C. by recirculation of water in the reactor jacket and in a thermostatic bath where the temperature is set. At the output of the reactor there is a 1 l settler. The waters are fed to the reactor by means of a peristaltic pump that draws from a glass tank with a volume of about 5 litres. The tank is filled with nitrogen to remove the traces of oxygen. In the truncated cone sedimentation tank, the dragged sludge thickens as a heavy phase and is recirculated to the reactor by means of a peristaltic pump. The digested water is discharged into a collection tank. The biogas accumulates in the reactor head and from there it is conveyed to a litres meter, to measure the flow rate thereof. Water is periodically sampled when feeding, in the reactor, and in output from the sedimentation tank to take measurements of COD, pH. When water is fed with COD from sucrose alone during the test, nutrients (($NH_4$)$_2HPO_4$ and $NH_4HCO_3$) and micronutrients (KCl, $MgSO_4$, $CaCl_2$) are added in order to maintain the ratios COD:N:P=50:2:1 and bicarbonate ($NaHCO_3$) is added in order to maintain the pH of the reactor centred around 7. In addition, FeCl$_2$ is dosed to facilitate the sedimentation of the sludge. When during the test the liquefaction water is also fed, nutrients and trace elements are not added but only NaHCO$_3$ to maintain the pH stable, because the other elements are already present in the liquefaction waters.

The active sludge remains on average at a concentration of total solids (TSS) equal to 10 g/l, of which 75% is the volatile fraction (VSS) (FIG. 5).

The course of the anaerobic digestion test is described with the aid of the following three drawings.

In the test that lasted overall from 1 Nov. 2016 to 14 Jan. 2017 there are 4 main phases:
1) Nov. 1, 2017-Sep. 11, 2017: acclimatisation of the sludge coming from an industrial wastewater treatment plant with an average COD of 2000 mg/kg of sucrose, with a hydraulic retention time HRT of 13.6 h and a volumetric load of 2.8 kg$_{COD}$/m$^3$/day. At the end of this phase, the conversion of the COD is about 90%, with an output COD of 200 mg/kg, the biogas produced is 0.32 litres/g of COD converted;
2) 10 Nov. 2017-18 Nov. 2017: dosage of COD from liquefaction waters to replace part of the sucrose, to tentatively keep the COD fed to the test constant at around 2000 mg/kg, with an average HRT of 40 h and a volumetric load of 0.8 kg$_{COD}$/m$^3$/day.

The COD fed due to the liquefaction waters is that traced in FIG. 3 with the dotted line, and which is made to grow to reach 80% of the total COD fed. With the dosage of liquefaction water, the conversion of the COD drops rapidly to 60% and then rises again to 70%. At the end of this phase the COD output is 420 mg/kg, followed by a phase of removal of the liquefaction water in the feed and this allows a recovery of the conversion of the COD to values close to 90%.
3) 23 Nov. 2016-20 Dec. 2016: dosage of COD from liquefaction waters in addition to 2000 mg/kg of COD from sucrose, with an average HRT of 55 h and a volumetric load of 1-1.4 kg$_{COD}$/m$^3$/day. The COD fed due to the liquefaction waters is the one traced in FIG. 3 with the dotted line, and which is grown to reach 35% of the total COD fed. With liquefaction water dosage, the COD conversion quickly drops to 60%. At the end of this phase the COD output is over 1500 mg/kg, biogas production drops to 0.19 litres/g of COD converted. This is followed by a phase of removal of the liquefaction water fed and its replacement with sucrose and this again allows a recovery of the conversion of COD to values close to 90%.
4) 2 Jan. 2017-10 Feb. 2017: dosage of COD from liquefaction waters initially in addition to 2000 ppm of COD from sucrose, with an average HRT of 53 h and a volumetric load from 0.9 to 1.8 kg$_{COD}$/m$^3$/day. The COD fed due to the liquefaction waters is the one traced in FIG. 3 with the dotted line, and which is made to grow to reach 100% of the total COD fed, equal to 4200 mg/kg. With liquefaction water dosage the COD conversion drops rapidly to 35%. At the end of this phase the COD output is over 2500 mg/kg, and the biogas production drops to 0.13 litres/g of converted COD.

The test shows the difficulty in removing the COD of the liquefaction waters associated with the presence of compounds that cause a strong inhibition of anaerobic digestion. This aqueous phase, as such, cannot be re-entered into the environment and must be further treated.

Example 2: Two-Stage Anaerobic Digestion of Liquefaction Waters from OFMSW (Batch Tests in 20 ml Syringe Reactors)

Anaerobic digestion tests were carried out on the same liquefaction waters described in Example 1 (water P9) in 20 ml syringe reactors, with measurements of COD conversion, biogas production, and generation of anaerobic digestion intermediates, in particular VFAs.

The methods of performing the tests are described below and shown in FIG. 6.
1) Remove the plunger, close the tip of the syringe with the rubber cap, add the anaerobic mud (inoculum) and the liquefaction water for a total of 20 ml.
2) Close the syringe with the plunger.
3) Turn over the syringe and let the contents settle on the bottom.
4) Slowly release the internal pressure by removing the cap, expel the air.
5) Close the syringe with the cap.
6) Put the syringe in the stove conditioned to the reaction temperature 40 or 60° C.
7) Determine the biogas produced every 24 hours, reading the ml of gases developed over the liquefaction water and expelling them from the syringe
8) Remove the cap and sample the digestate (inoculum+ liquefaction water)
9) Centrifuge the digestate to separate the dense phase, to be re-injected into the syringe reactor, from the liquid to be analysed.
10) Add liquefaction water to digest, using it also to take up again the dense phase separated in point 9.

Two tests were performed, at 40° C. (mesophilia) and 60° C. (thermophilia):

Both tests were performed in duplicate. The data shown in the graph (FIGS. 7 and 8) are the average of the 2 repetitions of each test. The concentrations of biogas and VFAs are reported in terms of converted original COD (mg/kg).

Initially, the syringes are fed with a glucose solution at 1600 mg/kg, then up to day 17 increasing concentrations of COD were administered from liquefaction waters up to about 24000 mg/kg corresponding to a volumetric load of 3.4 kg/m$^3$/day. Following progressive additions of COD a high CO$_2$ content in the biogas was observed and subsequently a total inhibition of biogas production. Starting from the 47th day, other portions of COD from liquefaction waters were administered, which produced a further increase in VFAs (up to a maximum of about 10 g/kg equal to COD 21000 mg/kg) and not in biogas. This suggests a complete inactivation of methanogens, but a maintained and efficient acidogenic activity (conversion of the original COD into VFAs). At the end of the test (74th day) the conversions of input COD into biogas and VFAs are around 90%.

A second set of reactors was then set up at 40° C., to which the liquid coming out from the first was administered with a concentration of VFAs of about 13 g/kg at a total COD of 18000 mg/kg and a maximum volumetric load of 2 kgCOD/m$^3$/day. The results are summarised in FIG. 9 and show that the conversion of COD to biogas reaches 80% and above all does not show a stasis but a trend that increases as a function of the COD fed, unlike what happened when performing the digestion in a single step (see FIG. 3). The conversion to volatile acids VFAs remains after 68 days around 18%.

Example 3: Two-Stage Anaerobic Digestion of the Liquefaction Waters from OFMSW (Continuous Testing in 80 ml Reactors)

A continuous two-stage anaerobic digestion test was carried out on the liquefaction waters described in Example 1 (water P9) in reactors each with a volume of 80 ml. The reactor temperatures are maintained at 60 and 40° C. by electric heating. The aqueous phases are fed to the first and second reactors by means of peristaltic pumps. An external recirculation from the second to the first reactor with peristaltic pump is provided. The gas and liquid leaving the second reactor are sampled and sent for analysis.

The methods of performing the test are described with the aid of FIG. 10 and the results are shown in FIG. 11.

The reactors are initially started up with 30 ml of active sludge inoculum and 50 ml of water and glucose to a COD of 21400 mg/kg. The same solution is continuously fed to the 1st reactor at 5 ml/day, corresponding to an HRT (hydraulic retention time) of 16 days for each reactor. The administration of the glucose solution is extended until the 16th day. From the 17th to the 21st day the reactors are fed with a liquefaction water at COD=22600 mg/kg at 2 ml/day, then from the 22nd day the feed is increased to 5 ml/day.

Example 4: Six-Stage Anaerobic Digestion of the Liquefaction Waters from OFMSW (with Simulation of Continuous Tests at a Flow Rate of 10 m³/h)

The test is carried out on a laboratory scale with an anaerobic reactor volume equal overall to 12 litres (2 litres for each stage) and 4 litres of aerobic reactor placed in series.

The volume of the stage (2 litres) is that referred to the ascending phase of the aqueous phase in which the bacterial biomass thickens. The overall volume of the stage is greater but only in the ascending part is the bacterial biomass present in a significant quantity.

For each stage, the desired temperature is guaranteed by thermal exchange with water currents at controlled temperatures circulating in different cavities of the reactor (heating jackets).

The treatment of the first aqueous phase is carried out continuously by passing through an anaerobic reactor followed by an aerobic reactor. The start of the treatment is dedicated to the acclimatisation of the available active sludge (sludge from industrial water treatment plant) to specialise the bacteria of the different stages. This acclimatisation is carried out with synthetic water in which the COD is generated with sucrose and fertilisers and trace elements are added, in the typical ratios of use in anaerobic digestion known in the state of the art. After the sludge has specialised and the aqueous phase leaving the aerobic reactor is less than 150 mg/kg, the liquefaction waters are fed with the same COD (from sucrose). This is followed by a transient phase, the COD in the second aqueous phase grows but then goes down again and reaches stable values. Referring to FIG. 15, the aqueous phase (d) is fed to the first stage of the multiple-stage reactor formed by a series of anaerobic stages [4A, 4B, 4C, 4D, 4E, 4F]. These reaction stages are characterised by decreasing temperatures from 65° C. to a final temperature of 38° C. in the final stage.

Table 5 shows the temperature profiles of the six compartments of the anaerobic reactor and the flow rates of the main currents.

TABLE 5

| Stage | Description |
|---|---|
| | Aqueous phase at 90° C. |
| [4A] | $1^{st}$ acidogenic phase at 65° C. |
| [4B] | $2^{nd}$ acidogenic phase at 60° C. |
| [4C] | $3^{rd}$ acidogenic phase at 55° C. |
| [4D] | $4^{th}$ acidogenic phase at 50° C. |
| [4E] | $5^{th}$ methanogenic phase at 40° C. |
| [4F] | $6^{th}$ methanogenic phase at 38° C. |
| [5] | Aerobic reactor at 25° C. |

| Current | Flow rate |
|---|---|
| d | First aqueous phase: 0.3 kg/day with 130000 mg/kg of COD |
| m | 20 Nl/day of biogas (512 Nl/kg$_{CODconv.}$) |
| l | Second aqueous phase 1.5 kg/day with COD ≤ 5000 mg/kg |
| o | Long recirculation 1.2 kg/day with COD 150 mg/kg |
| p | Short recirc. 0 mg/kg kg/day with COD 150 |
| f | Output aerobic mg/kg digester with COD 150 |
| q | Entrance first anaerobic reactor 1.5 kg/day with 26000 mg/kg of COD |

In the first 4 stages of the anaerobic reactor, populated by hyperthermophilic and acidogenic thermophilic bacterial communities, the conversion takes place of the organic substances present in the aqueous solution fed (q) into VFAs and other soluble intermediates. In the next 2 stages, populated by mesophilic microbial communities, the conversion takes place of said soluble intermediates into biogas, with a second aqueous phase (i) being obtained, characterised by a COD≤5000 mg/kg 0.3 kg/day of the first aqueous phase with COD 130000 mg/kg, are mixed initially with 1.2 kg/day of well water (and when available, alternatively with 1.2 kg/day of water leaving the aerobic digestion stage (o) with COD 150 mg/kg), forming a diluted current with COD approximately equal to 26000 mg/kg (q). The current (o) is defined as long recirculation. The dilution ratio of the proposed scheme is 1:4. The total volume of the anaerobic reactor is 12 l resulting from the sum of 6 contiguous volumes. Each segregated volume is equal to 2 l. The first 4 volumes work with acidogenic sludge and the hydraulic retention time in the 4 acidogenic reactors is 128 h in total. After the 4th acidogenic anaerobic stage, the aqueous phase moves to the volumes in which the methanogenic bacterial biomass is contained and where the aqueous phase remains for a hydraulic retention time (overall in both reactors) of 64 h. From the last anaerobic stage, a gaseous current (m) flows out and is sent to a volumetric counter to estimate the quantity of biogas produced. A conversion of the COD has been observed when fully operational into VFAs in acidogenic reactors of 90% (starting from COD=26 000 mg/kg), and a conversion of the COD to biogas in the methanogenic reactors of 80%, hence a biogas productivity of 20 litres/day or 512 N litres of biogas/kg of COD converted and a COD=5000 mg/kg in the second aqueous phase to be sent to the aerobic reactor [5]. The total organic load of the anaerobic reactor is 3.2 kg$_{COD}$/m³$_{Reactor}$/day.

The second aqueous phase generated passes into the aerobic reactor, where it remains in suspension due to the introduction of air from a distribution ring placed at the base of the cylindrical reactor with a volume of 4 litres. The overflow of the reactor feeds a settler with a useful volume of about 0.5 litres, from whose bottom the thickened sludge is recirculated to the reactor. From the upper part of the settler, the treated and clarified water is recovered for subsequent uses. The hydraulic retention time in the aerobic reactor is 2.7 days. The current leaving the aerobic stage (f) has a residual COD of less than 160 mg/kg.

The total time for which the first aqueous phase remains in the anaerobic reactor is 192 hours, equal to 8 days, and the time for which the second aqueous phase remains in the aerobic reactor is 2.7 days.

From the laboratory scale data, a case was simulated, according to the diagram in FIG. 15, of size of industrial interest equal to the need to treat 10 m$^3$/h of the first aqueous phase from OFMSW liquefaction, characterised by a COD=130 000 mg/kg. The anaerobic reactor is expected to operate with an organic load of 3.2 Kg$_{COD}$/m$^3_{reactor}$/day. From these assumptions for the complete treatment (COD at exhaust ≤160 mg/kg) of the above mentioned OFMSW liquefaction waters, a total anaerobic reactor volume of 12000 m$^3$ is estimated followed by an aerobic reactor volume of 4000 m$^3$ (including 20% oversizing), with associated production of 665 Nm$^3$ of biogas/h at full speed.

The invention claimed is:

1. A process for the production of liquid fuel, and of a gaseous fuel, from biomass, which comprises the following steps:
   a. send biomass to a pre-treatment section to form a homogeneous phase that can be moved and/or pumped, in which the following operations are carried out:
      inert parts are separated from the biomass, and
      the biomass is shredded and/or ground to reduce the size thereof and make it moveable and/or pumpable, forming the homogeneous phase;
   b. the homogeneous phase obtained by pre-treatment is subsequently subjected to subcritical hydrothermal liquefaction at a temperature between 240° C. and 310° C. and at a pressure between 40 bar and 110 bar to form a liquefied phase;
   c. the liquefied phase coming out of the liquefaction (b) is subsequently subjected to either
      I. a physical separation by different density or dynamics, obtaining a first aqueous phase, a gaseous phase, and an oily phase, wherein the gaseous phase is sent into the atmosphere after treatment, and wherein the oily phase is subsequently separated into a bio-oil and a solid residue, classifiable as secondary solid fuel (SSF); or
      II. a separation by different size so as to remove a solid residue from a mixed phase, which contains a gaseous fraction, an aqueous fraction and an oily fraction;
   d. after separation, the process continues in two alternative and mutually exclusive ways as follows:
      a.1 in a first mode
         the first aqueous phase obtained in (I) is subjected to a multiple-stage anaerobic reaction of four to six stages in series from which a biogas, an anaerobic sludge and a second aqueous phase are produced, wherein the four to six stages are maintained at decreasing temperatures, wherein the four to six stages are maintained at decreasing temperatures, wherein a penultimate stage is a methanogenic stage, wherein the dwell time in each stage is from 2 to 8 days; and
      after the anaerobic reaction, the second aqueous phase is subsequently subjected to an aerobic reaction to obtain a purified aqueous phase, wherein a part of the purified aqueous phase is recirculated and admixed with the first aqueous phase in a ratio of 1:2 to 1:10 w/w forming a current entering the first stage and a part of the purified aqueous phase is recirculated and admixed with a stream entering the methanogenic stage, wherein the current entering the first stage is preheated to at least 60° C.; or
      b.1 in a second mode
         the mixed phase obtained in (II) is subsequently subjected to a separation by different density or dynamics, obtaining a first aqueous phase, a bio-oil and a gaseous phase, which is sent into the atmosphere after treatment;
         the first aqueous phase is subjected to a multiple-stage anaerobic reaction of four to six stages in series from which a biogas, an anaerobic sludge and a second aqueous phase are produced, wherein the four to six stages are maintained at decreasing temperatures, wherein the four to six stages are maintained at decreasing temperatures, wherein a penultimate stage is a methanogenic stage; and
         the second aqueous phase is subsequently subjected to an aerobic reaction to obtain a purified aqueous phase, wherein a part of the purified aqueous phase is recirculated and admixed with the first aqueous phase in a ratio of 1:22 to 1:10 w/w forming a current entering the first stage and a part of the purified aqueous phase is recirculated and admixed with a stream entering the methanogenic stage, wherein the current entering the first stage is preheated to at least 60° C.

2. The process according to claim 1, wherein the biomass is selected from the group consisting of organic waste and refuse, an organic fraction of municipal solid waste resulting from separate collection, a wet fraction, and mixtures thereof.

3. The process according to claim 1, wherein subcritical hydrothermal liquefaction is carried out at the liquefaction temperature from 280° C. and 300° C. and at a pressure from 70 bar and 110 bar.

4. The process according to claim 1, wherein a hydraulic retention time during the anaerobic reaction is from 80 to 800 hours.

5. The process according to claim 4, wherein the hydraulic retention time during the anaerobic reaction is from 120 to 500 hours.

* * * * *